United States Patent [19]

Michaels

[11] 4,343,685
[45] Aug. 10, 1982

[54] PROCESS FOR PREPARING A CHEMICAL COMPOUND ENRICHED IN ISOTOPE CONTENT

[75] Inventor: Edward D. Michaels, Spring Valley, Ohio

[73] Assignee: The United States of America as represented by the United States Department of Energy, Washington, D.C.

[21] Appl. No.: 238,711

[22] Filed: Feb. 25, 1981

[51] Int. Cl.³ .................. B01D 59/32; C25B 1/02; C25B 1/22
[52] U.S. Cl. ...................... 204/101; 204/59 R; 204/129
[58] Field of Search ............. 204/59, 101, 103, 129, 204/DIG. 4

[56] References Cited

U.S. PATENT DOCUMENTS 3,974,048 8/1976 Hammerli et al. .................. 204/101

Primary Examiner—Howard S. Williams
Attorney, Agent, or Firm—Armand McMillan; Albert Sopp; Richard G. Besha

[57] ABSTRACT

A process to prepare a chemical enriched in isotope content which includes:
  (a) A chemical exchange reaction between a first and second compound which yields an isotopically enriched first compound and an isotopically depleted second compound;
  (b) the removal of a portion of the first compound as product and the removal of a portion of the second compound as spent material;
  (c) the conversion of the remainder of the first compound to the second compound for reflux at the product end of the chemical exchange reaction region;
  (d) the conversion of the remainder of the second compound to the first compound for reflux at the spent material end of the chemical exchange region; and the cycling of the additional chemicals produced by one conversion reaction to the other conversion reaction, for consumption therein. One of the conversion reactions is an oxidation reaction, and the energy that it yields is used to drive the other conversion reaction, a reduction. The reduction reaction is carried out in a solid polymer electrolyte electrolytic reactor. The overall process is energy efficient and yields no waste by-products.

6 Claims, 2 Drawing Figures

PROCESS FOR PREPARING A CHEMICAL COMPOUND ENRICHED IN ISOTOPE CONTENT

The United States Government has rights in this invention pursuant to contract number EY-76-C-04-0053 between the United States Department of Energy and Monsanto Research Corporation, Miamisburg, Ohio (41 C.F.R. Section 9-9.109-6(i)(5)(ii)(B)).

BACKGROUND OF THE INVENTION

This invention relates to a process for producing a chemical compound enriched in isotope content. More particularly, it relates to the production of an isotopically enriched chemical compound by means of chemical exchange.

In the prior art, it is known to use a fuel cell in combination with an electrolysis cell, and to use the product of one of these cells as the starting material in the other cell. This technique is illustrated by U.S. Pat. No. 3,981,745 to Stedman, in which a fuel cell uses hydrogen and oxygen as starting materials to produce water and electricity, and the water formed in this cell is used as the starting material in an electrolysis cell. Similarly, an oxidation step has been combined with a reduction step, with the oxygen formed in the reduction step being used as the oxidizing agent in the oxidation step. U.S. Pat. No. 3,100,163 to Lyons, Jr. discloses such a system. It is also known to regenerate nitric acid in an electrochemical cell, as shown by Moerikofer in U.S. Pat. No. 3,281,274. Coupling chemical exchange with an electrolysis step is known, as illustrated by U.S. Pat. No. 3,974,048 to Hammerli, et al., which relates to the production of heavy water. Also known is the coupling of chemical exchange with a chemical reactor, for the production of $HNO_3$ enriched in $N^{15}$ from isotopically enriched NO. This type of prior art is illustrated by the work of William Spindel and T. I. Taylor, as published in *J. Chem. Physics*, Vol. 23, p. 981 (1955); *J. Chem. Physics*, Vol. 24, p. 626 (1956); and *Proceedings of the International Symposium on Isotope Separation*, p. 158, North Holland Publishing Company, Amsterdam (1958). In some of this work, $SO_2$ is used as a reagent for the conversion of $HNO_3$ to NO to provide NO to a chemical exchange column, with the formation of $H_2SO_4$ as a waste by-product. This type of process is material-inefficient, since it requires the use of an outside reagent and forms a waste product that must be subsequently treated. It is also energy-inefficient.

It is, accordingly, one object of the present invention to provide a material-efficient process for preparing a chemical compound enriched in isotope content.

A further object is to provide an energy-efficient process for preparing a chemical compound enriched in isotope content.

Additional objects, advantages, and novel features of the invention will be set forth in the description that follows, and in part will become apparent to those skilled in the art upon examination of the following, or may be learned by practice of the invention. The objects and advantages of the invention may be realized and attained by means of instrumentalities and combinations particularly pointed out in the appended claims.

SUMMARY OF THE INVENTION

To achieve the foregoing objects and in accordance with the purpose of the invention, as embodied and broadly described herein, the present invention is directed to an energy efficient and material-efficient process for preparing a chemical compound enriched in isotope content. This process includes the steps of: (a) countercurrently contacting a first compound with a second compound in a multistage chemical exchange region, where an isotopic enrichment of the compounds occurs toward the product end of the region and an isotopic depletion of the compounds occurs toward the spent material end of the region; (b) converting the first compound to the second compound at the enriched end of the chemical exchange region and removing a small portion of this flow as product, while returning the bulk of the flow to the chemical exchange region as reflux; (c) converting the second compound to the first compound at the depleted end of the chemical exchange region and removing a small portion of this flow as waste, while returning the bulk of the flow to the chemical exchange region as reflux, and (d) cycling the additional chemical products yielded by one of the converting steps to the other converting step for consumption therein.

The first and second compounds are capable of being interconverted by oxidation and reduction of the principal element in said compounds. One of the converting steps is an oxidation reaction, and the other is a reduction reaction. One of these reactions (generally the oxidation reaction) produces energy while the second (generally the reduction reaction) consumes an equal amount of energy. Furthermore, in the case of an oxidation reduction system associated with chemical exchange processes, the by-products formed in the reduction reaction are precisely the reagents required for the oxidation reaction, and vice versa. The energy generated in one reaction (generally the oxidation reaction) serves to drive the second reaction (generally the reduction reaction). A solid polymer electrolyte electrolytic reactor is employed in the reduction reaction. As a result of these various steps, the process does not yield any by-product and is energy efficient.

BRIEF DESCRIPTION OF THE DRAWINGS

The accompanying drawings, which are incorporated in and form part of the specification, illustrate a preferred embodiment of the invention and, together with the description, serve to explain its principles. In the drawings.

DETAILED DESCRIPTION OF THE INVENTION

Figure 1:
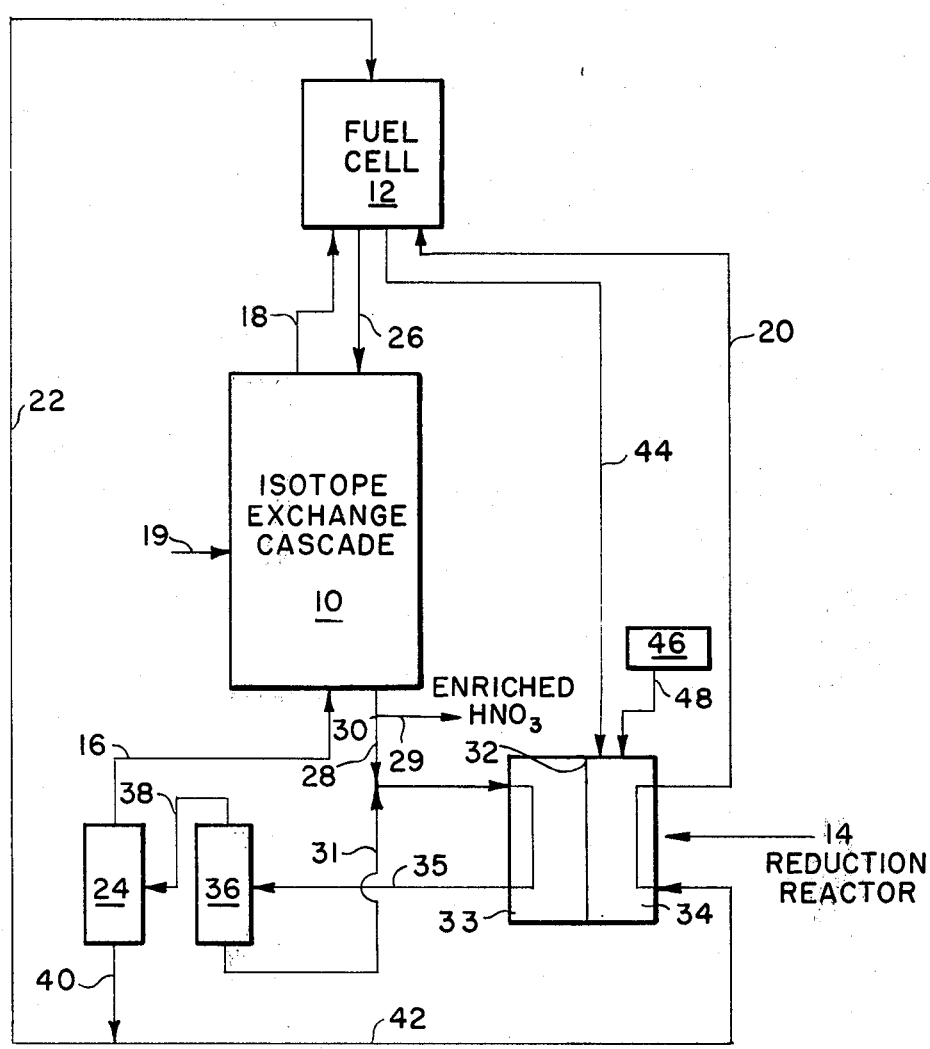
FIG. 1 is a schematic representation of the overall process of the invention.
Figure 2:
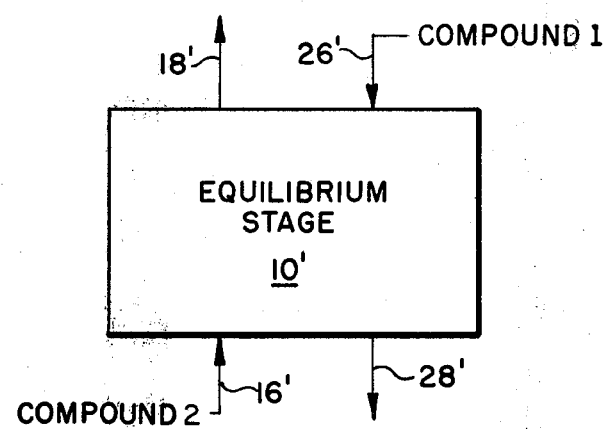
FIG. 2, on the other hand, illustrates schematically one of the many equilibrium stages which form the chemical exchange region of the new process.

The new process for the preparation of a chemical compound enriched in isotope content, can be described as follows:

In the first essential step, a countercurrent chemical exchange procedure is repeatedly carried out in equilibrium stages between a first chemical compound and a second chemical compound. One of these many equilibrium stages, which constitute the isotope exchange cascade 10 of FIG. 1, is shown schematically in FIG. 2. Referring to the latter figure, an equilibrium stage 10' is shown into which compound 1 is lead through line 26' to emerge in an isotopically enriched state through line 28' at the bottom of the stage. Compound 2, in contrast, enters the stage at the bottom through line 16', mixes with compound 1 in 10', and then emerges at the top of the stage in an isotopically depleted state through line 18'. In such a process, compounds 1 and 2 enter the stage with equal isotopic concentrations and leave the stage in thermodynamic equilibrium, i.e. with one compound slightly enriched and the other slightly depleted in isotope content. Useful levels of enrichment are attained in the chemical exchange region 10 of FIG. 1 by repeated application of the equilibrium stage process just described.

The chemical exchange reaction is actually carried out in a column by passing the first and second chemical compounds in a countercurrent mode through chemical exchange regions in said column. Chemical exchange reactions of this type are known to the art, with operating conditions and column size being dependent upon the nature of the particular compounds involved. Such a reaction takes place, for example, between the gas nitrous oxide (NO) and aqueous nitric acid ($HNO_3$), a system in which thermodynamic equilibrium favors a slight enrichment of the $N^{15}$ in the $HNO_3$.

The material forming the chemical exchange region varies depending upon the particular compounds selected for carrying out the exchange, and, to some extent, upon column diameter and operating parameters. In this respect, there is hereby incorporated by reference into this application the pertinent disclosures of William Spindel and T. I. Taylor, discussed earlier, relating to column material, column size and conditions used to carry out chemical exchange between NO and $HNO_3$.

In the second essential step of the process of the invention, the enriched first chemical compound is converted to the second chemical compound, this conversion being conveniently done in an electrolytic cell. The second chemical compound is then returned to the chemical exchange region, after a small portion of it has been removed as product, as described earlier.

In the next essential step of the process, the isotopically depleted second compound is converted to the first compound, suitably in a fuel cell, with a small portion removed as spent material and the remainder returned to the chemical exchange region.

As can be seen, the two converting steps interconvert the first and second chemical compounds. One of the converting steps is an oxidation reaction, and the other is a reduction reaction. The oxidation reaction produces energy that is used to drive the reduction reaction, and in this way functions as a fuel cell. As a consequence, the only external power required is that needed to replace power loss due to thermodynamic inefficiency. For this purpose, an external power supply is available for use as needed.

The reduction reaction is carried out in a solid polymer electrolyte electrolytic reactor. This type of reactor is well known and is available from General Electric. The solid polymer electrolyte forms a non-porous membrane that divides the reactor into a cathode compartment and an anode compartment. In this reactor, other compounds are formed in addition to the main reduction product. Certain of these additional products, such as $H_2O$, are subsequently separated from the main chemical compound produced in the reactor, by conventional means such as a gas stripper and/or a drying column. These additional chemical products are cycled to the oxidation reaction, where they are consumed. The operating parameters for carrying out the reduction reaction are illustrated in the description below, in terms of the $HNO_3$-NO system. As to oxidation reaction, it is carried out using conventional operating parameters.

In accordance with the invention, the first and second chemical compounds produced by the second and third essential steps, respectively, are cycled to the chemical exchange region, described above, to maintain the chemical exchange reaction. As the final essential step of the process, the additional chemical products, described above, are cycled to the oxidation step, for consumption therein.

In a preferred embodiment of the process, the first chemical compound is an inorganic liquid, and the second chemical compound is an inorganic gas. Referring to the FIG. 1, there is shown a preferred embodiment, in which the inorganic gas is NO and the inorganic liquid is $HNO_3$.

Isotope exchange cascade 10 is disposed between fuel cell 12 and solid polymer electrolyte electrolytic reactor 14. Line 16 passes NO enriched in $N^{15}$, into the bottom of cascade 10, and isotopically depleted NO is passed by line 18 from the top of cascade 10 to fuel cell 12. Line 19 supplies additional natural abundance $HNO_3$ feed to an appropriate location in the isotope exchange cascade to compensate for the removal of product and spent materials. Lines 20 and 22, respectively, feed to fuel cell 12, the approximate stoichiometric amounts of $O_2$ and water required to produce $HNO_3$ from the NO. The $O_2$ is formed in reactor 14, and the immediate source of the water is drying column 24. The water, $O_2$, and NO are electrolytically converted in fuel cell 12 by an oxidative reaction to $HNO_3$, and there is also produced electrical energy. The electrolysis is carried out using conventional procedures.

Line 26 feeds the $HNO_3$ from cell 12 into the top of cascade 10. The $HNO_3$ moves downwardly through cascade 10 in countercurrent relation to the NO, and undergoes an enrichment in $N^{15}$ as the NO becomes depleted in $N^{15}$. The greater the length of cascade 10, the relatively greater is the enrichment of the $HNO_3$ and the relatively more depleted the NO becomes, whereas the shorter the length of cascade 10, the relatively less is the enrichment of the $HNO_3$ and the relatively less depleted the NO becomes.

The enriched $HNO_3$ exits from the bottom of cascade 10 by line 28, which is junctioned by line 29 at point 30. A portion of the enriched $HNO_3$ is removed from line 28 by line 29, and downstream from point 30, line 31 junctions with and feeds into line 28, a stream containing water, any unconverted enriched $HNO_3$ and a multivalent metal ion, such as $Cu^{+2}$. After this junction, line 28 feeds the stream to reactor 14.

Reactor 14 contains a non-porous membrane 32 formed of a solid polymer electrolyte. This type of reactor is known and is available from General Electric. Membrane 32 divides reactor 14 into a cathode compartment 33 and an anode compartment 34. Hydrogen ions formed in the anode compartment undergo an ion exchange reaction with membrane 32, diffuse through the membrane and undergo another ion exchange reaction on the cathode compartment side of the membrane. The anode compartment half-reaction is as follows:

$$H_2O \rightarrow 2H^+ + 2e^- + \tfrac{1}{2}O_2.$$

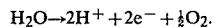

The reactions in the cathode compartment are the following when the multivalent metal ion is copper:

$$3Cu^{+2} + 3e^- \rightarrow 3Cu^+$$
$$3Cu^+ + 3H^+ + HNO_3 \rightarrow 3Cu^{+2} + NO + 2H_2O.$$

As can be seen from these reactions, $O_2$ is produced in anode compartment 34. This $O_2$ constitutes approximately the stoichiometrically required quantity and is fed by line 20 to fuel cell 12 for consumption in the production of $HNO_3$. These reactions also show that NO and water are produced in cathode compartment 33. The cathode compartment requires in the NO-$HNO_3$ system, a multivalent metal ion. This metal ion is supplied, for example, by copper nitrate, iron nitrate, or chromium nitrate. As shown in the equations, $Cu^{+2}$ is converted to $Cu^{+1}$, and then regenerated in compartment 33.

The No gas enriched in $N^{15}$, is suitably separated from the $Cu^{+2}$ and water, as well as from any unconverted enriched $HNO_3$. Initially, the effluent from compartment 33 of reactor 14 is fed by line 35 to NO stripper 36. In stripper 36, the enriched NO gas is desorbed from the liquid phase to separate it and water from the other components of the effluent. The liquid phase is then fed by line 31, as described earlier, to line 28, to provide a recycling of the multivalent metal ion catalyst. The NO and water are then passed from stripper 36 by line 38 to drying column 24, which is a distillation column. Column 24 separates the water from the isotopically enriched NO, passed by line 16 to cascade 10, as described earlier.

The water from drying column 24 exits by line 40, which splits into line 22 and line 42. As explained above, line 22 feeds the approximate stoichiometrically required amount of water to fuel cell 12. Line 42 feeds the balance of the water to anode compartment 34, in order to form $O_2$ therefrom. Thus, the water and $O_2$ formed in reactor 14 are cycled to fuel cell 12, for consumption therein.

The electrical energy generated by fuel cell 12 is passed by line 44 to reactor 14. Any additional energy needed to drive reactor 14 is provided by external power supply 46 via line 48.

As can be seen, NO and $HNO_3$ are produced for cascade 10 by oxidation-reduction conversion reactions. Also, the $O_2$ and water formed in the reduction step are consumed in the process, and the quantities formed are approximately stoichiometric in terms of the requirements for the production of $HNO_3$ from isotopically depleted NO. Therefore, the process yields no waste products and is energy efficient.

Reactor 14, equipped with a sulfonated poly(tetrafluoroethylene) membrane, suitably has an active surface area of about 45.6 cm² per cell, and is operated at a current density ranging from about 400 to 800 amp/ft². A convenient cathode compartment flow rate is within the range of about 120 to 200 cm³/min, and an advantageous anode compartment flow rate is about 120 cm³/min. The operating temperature can range from about ambient temperature to 80° C.

The conditions under which reactor 14 is operated will now be illustrated in greater detail. The solid polymer electrolyte electrolytic reactor, described above, and having an active surface area of 45.6 cm² per cell in order that the change in acid composition be very slow compared to the residence time of the cell, is used. Copper nitrate provides the multivalent metal ion needed, and the current density is fixed at 400 amp/ft², 600 amp/ft², and 800 amp/ft². The cathode flow rate is 120 cm³/min, and the anode flow rate is 120 cm³/min. The reactor is operated at ambient temperature. In each case, a current efficiency of 100% results and the voltage efficiencies range from 90% to 55% at high current densities. Use of a higher temperature of about 80° C., a higher cathode flow rate of about 200 cm³/min or a different multivalent metal ion, such as that provided by iron nitrate or chromium nitrate, produce similar voltage efficiencies at high current densities.

In the case of the NO-$HNO_3$ system, described in detail above, the percent $N^{15}$ in the enriched $HNO_3$ depends upon a number of factors, including the length of cascade 10, as mentioned earlier. For this particular system, there can be produced $HNO_3$ having up to about 99% $N^{15}$. This is possible using as the feed NO gas having about 0.37% of the nitrogen present as $N^{15}$. This latter percentage of $N^{15}$ represents the natural abundance of $N^{15}$. With NO containing about 0.37% $N^{15}$, the ultimate isotopically depleted NO contains about 0.2% $N^{15}$.

When cascade 10 is a small column about 1 to 4 inches in diameter, a high efficiency random packing is convenient. Exemplary packings, for use in a column of this size, are Pro-pak and Heli-pac, when operating the NO-$HNO_3$ system.

In addition to the preparation of $N^{15}$ enriched $HNO_3$ obtained by applying the process of the invention to the NO-$HNO_3$ system, it will be readily understood by the man skilled in the art that the new energy and material efficient process can be similarly applied to other chemical systems with suitable changes and adaptations without departing from the scope of the invention claimed herein.

I claim:

1. An energy-efficient process capable of yielding a chemical compound enriched in isotope content without forming waste by-products, said process comprising the steps of:
  (a) countercurrently contacting a first chemical compound with a second chemical compound in a chemical exchanger region to produce an isotopically enriched first compound at one end of the chemical exchange region and an isotopically depleted second compound at the other end of the chemical exchange region, said first and second chemical compounds being capable of interconversion by oxidation and reduction reactions;
  (b) converting the first compound to the second compound at the enriched end of the chemical exchange region, and removing a small portion of the flow as product, while returning the bulk of the flow to the chemical exchange region as reflux;
  (c) converting the second compartment to the first compound at the depleted end of the chemical exchange region and removing a small portion of this flow as spent material, while returning the bulk of the flow to the chemical exchange region as reflux, wherein one of said conversion steps is an oxidation reaction and the other of said conversion steps is a reduction reaction; wherein the oxidation reaction yields energy that serves to drive the reduction reaction; and wherein a solid polymer electrolyte electrolytic reactor is used to carry out the reduction reaction which yields the reduced form of the isotope containing chemical compound and additional chemical products that are subsequently separated from the reduced compound;

(d) cycling the first and second chemical compounds produced by steps (c) and (b), respectively, to the chemical exchange region; and (e) cycling the additional chemical reduction products to the oxidation reaction for consumption therein.

2. The process of claim 1 wherein the first chemical compound is an inorganic liquid and the second chemical compound is an inorganic gas.

3. The process of claim 2 wherein: the inorganic gas is NO and the inorganic liquid is $HNO_3$; the oxidation reaction yields $HNO_3$ and electrical energy, and the reduction reaction yields NO and $O_2$ and water as additional chemical products; and a multivalent metal ion catalyst is used in said reduction reaction.

4. The process of claim 3 wherein the NO gas is recovered for recycling by feeding an NO gas-containing effluent from the reduction reaction to an NO stripper to produce NO and water, and a liquid phase, and then feeding the NO and water to a drying column to separate the NO gas.

5. The process of claim 3 wherein the multivalent metal ion catalyst is provided by copper nitrate, iron nitrate, or chromium nitrate.

6. The process of claim 5 wherein the metal ion catalyst is $Cu^{+2}$.

* * * * *